United States Patent Office 3,020,208
Patented Feb. 6, 1962

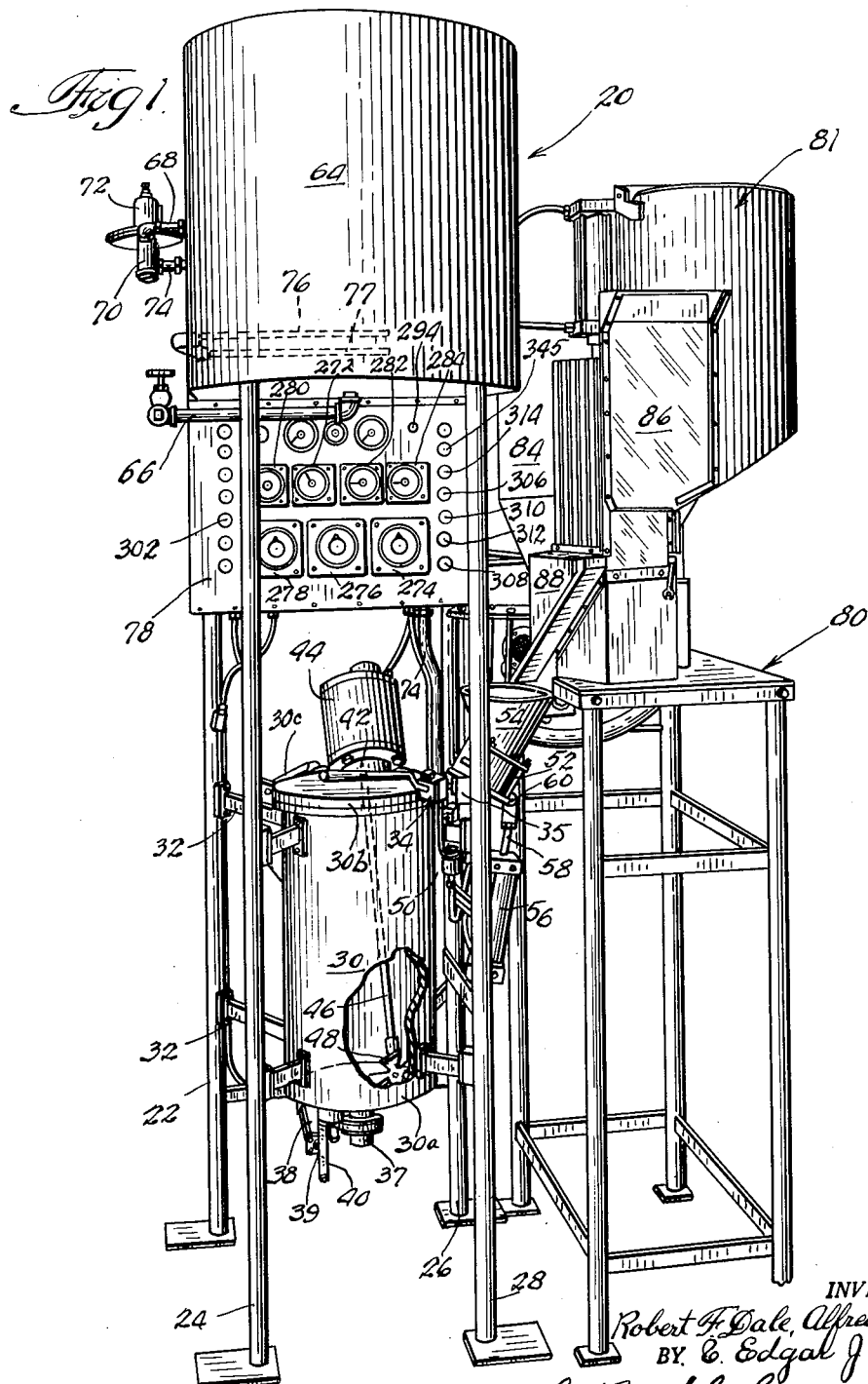

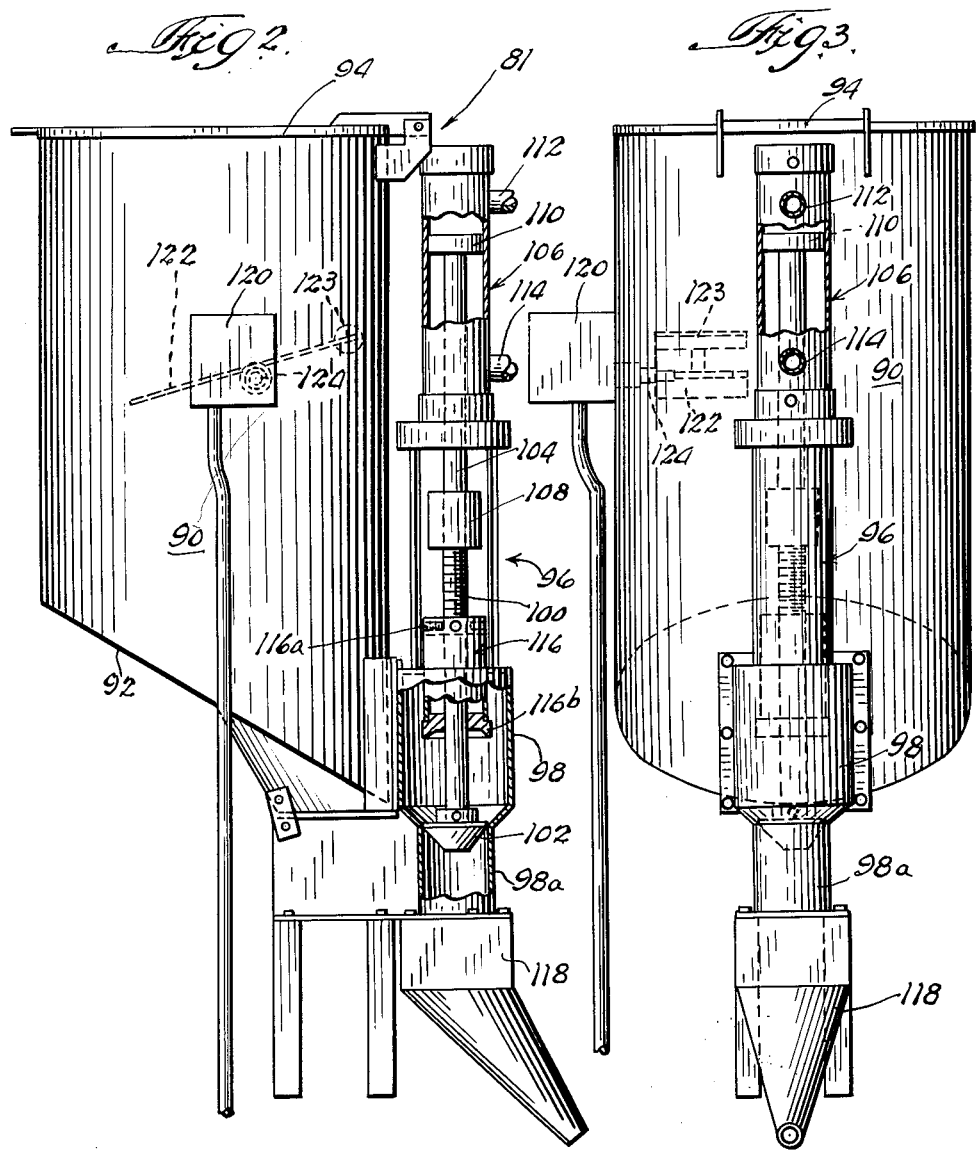

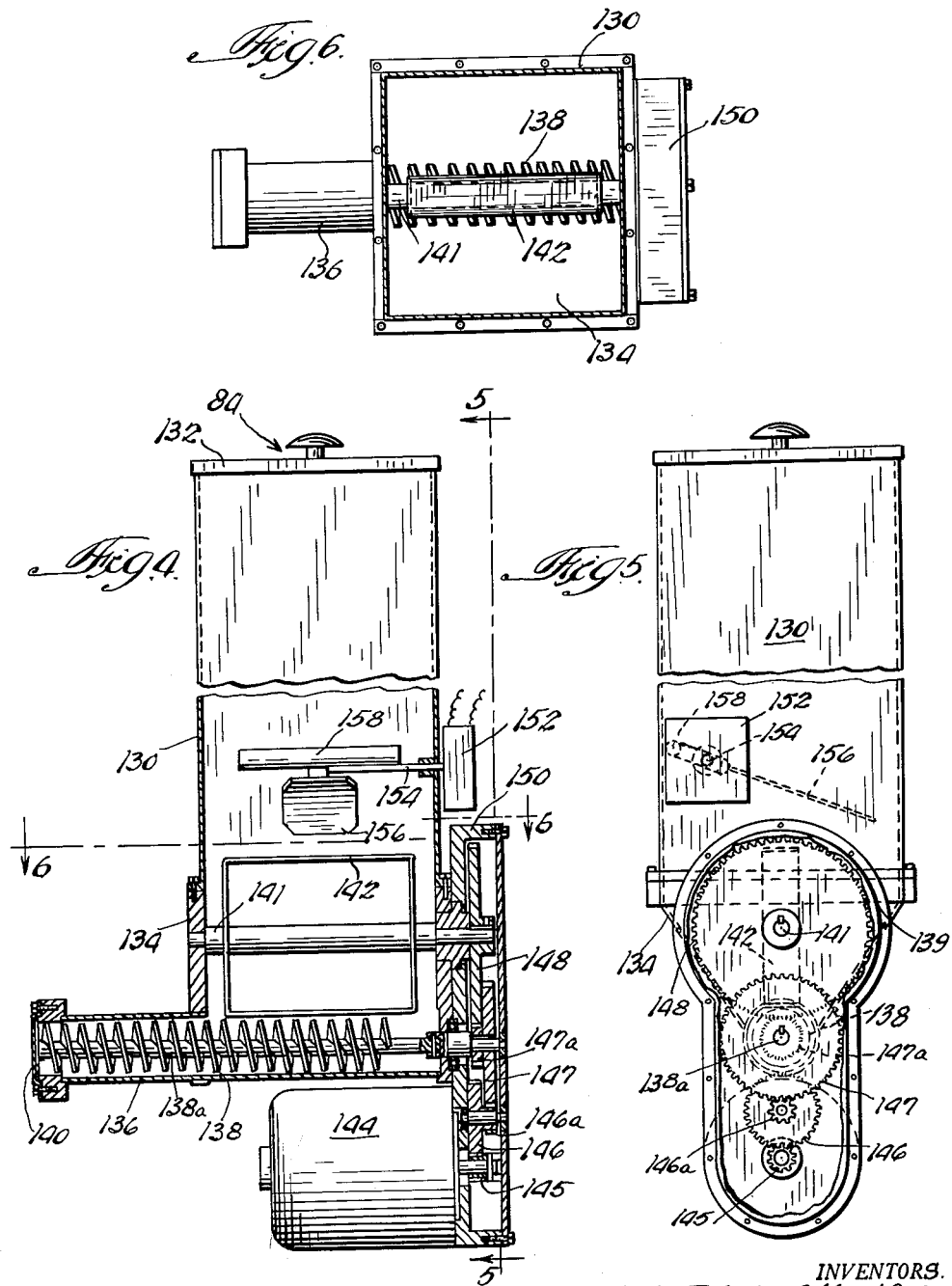

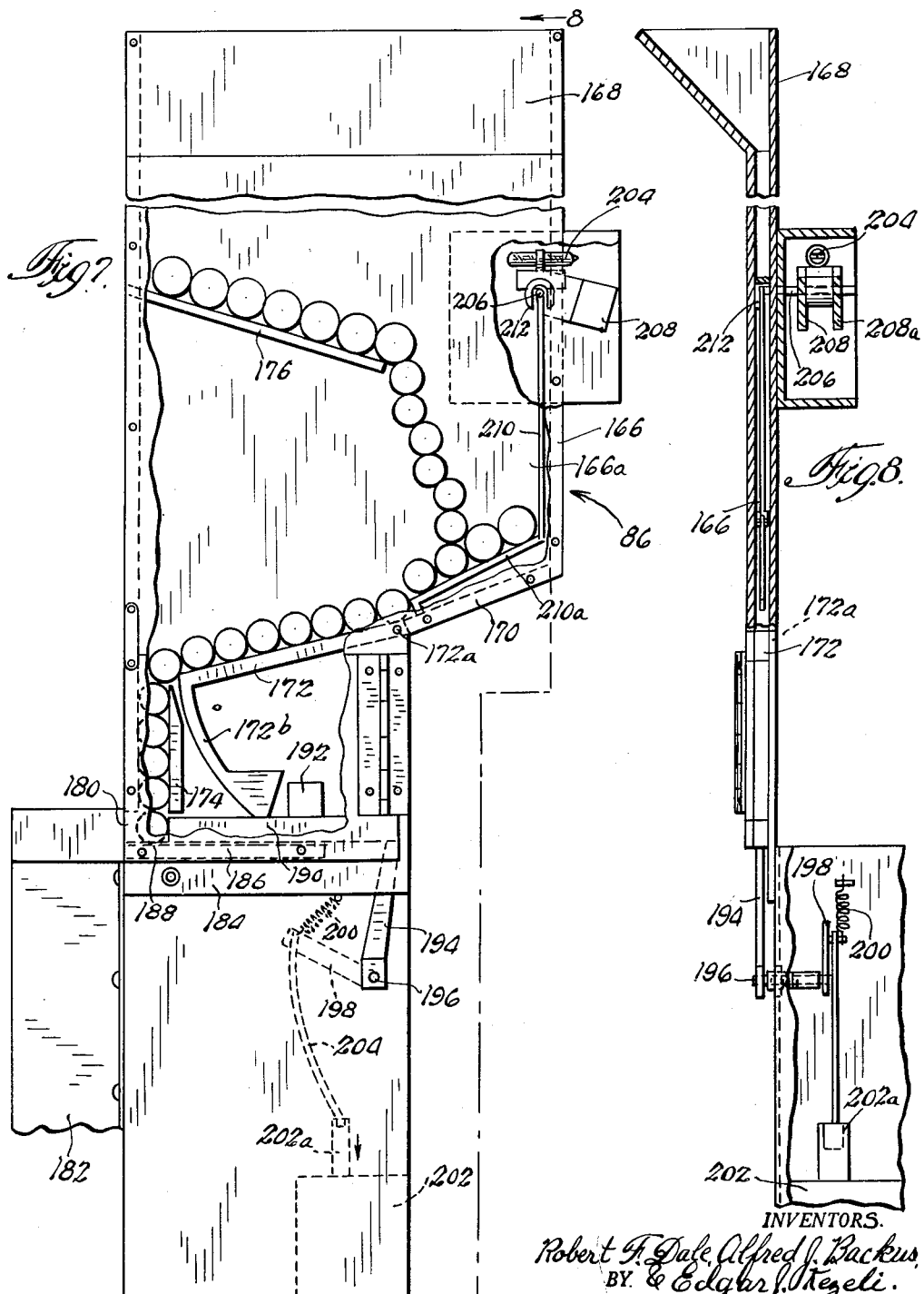

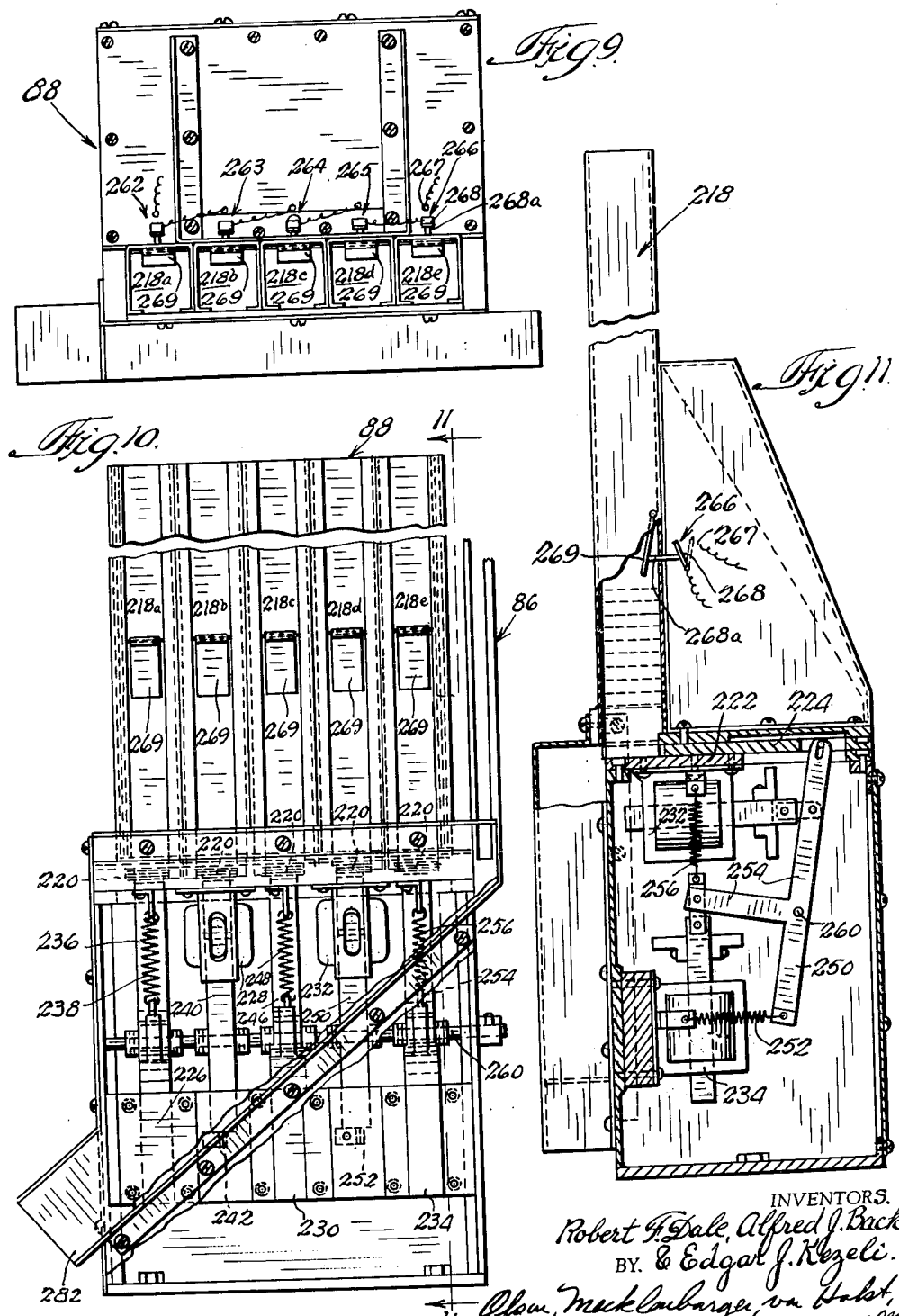

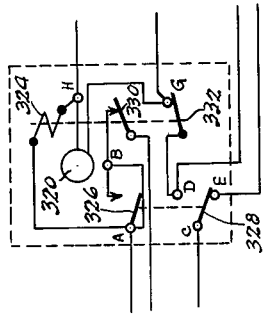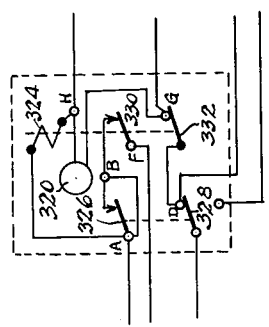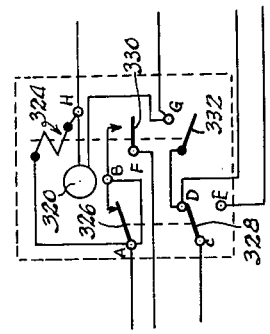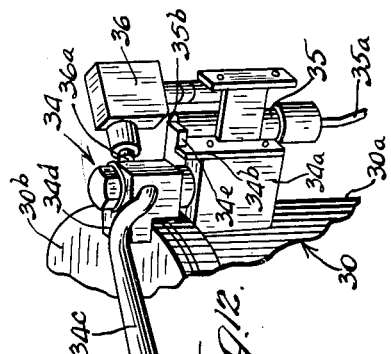

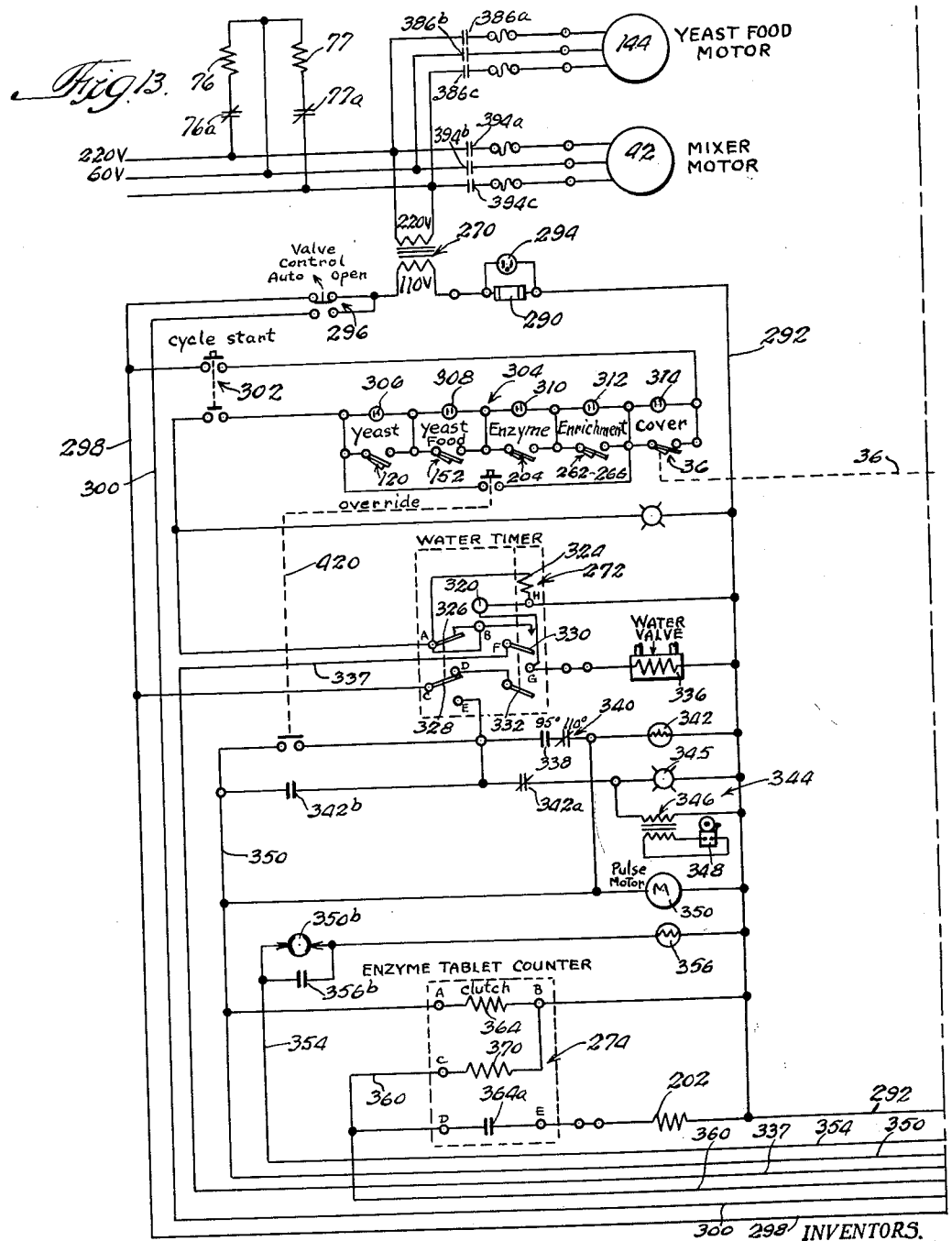

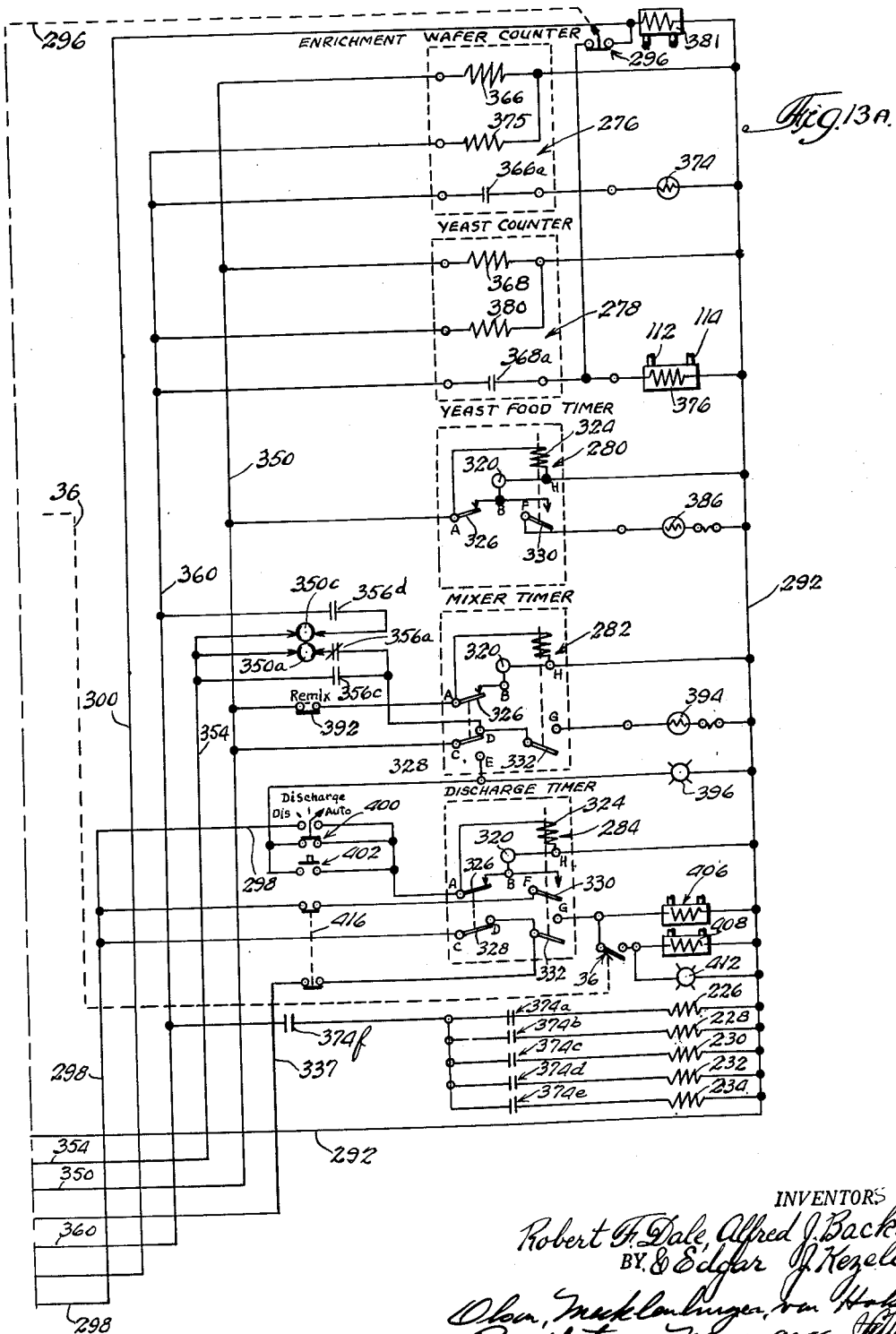

3,020,208
ACTIVE DRY YEAST REHYDRATOR
Robert F. Dale, Elm Grove, Alfred J. Backus, West Bend, and Edgar J. Kezeli, Grafton, Wis., assignors to Red Star Yeast and Products Company, Milwaukee, Wis., a corporation of Wisconsin
Filed Aug. 10, 1960, Ser. No. 48,591
20 Claims. (Cl. 195—127)

This invention relates to a rehydration apparatus and more particularly to an apparatus for effecting the rehydration of active dry yeast.

Active yeast which is used in baking is presently available in either press cake or dehydrated (dry) form. The active yeast cells in press cake yeast comprise between about 65 percent and about 75 percent water, and yeast in this form must be used relatively soon, usually within one month, after it is placed in this form, and it must be stored under refrigerated conditions. In contradistinction, active dry yeast is yeast, the cell water content of which has been carefully reduced to a level of about 8 percent or less under controlled conditions which will not unduly affect the viability of the yeast. This viable dry yeast may be stored under oxygen-free conditions in a nitrogen atmosphere for extended periods of time without refrigeration. In such an atmosphere this unrefrigerated dry yeast is much more stable than refrigerated press cake yeast, i.e., the activity of a given quantity thereof is not as greatly dependent upon or effected by time as is the case with pressed cake yeast.

In order to use the active dry yeast, however, it is necesasry that it be rehydrated, preferably under conditions which will most nearly and predictably restore its original level of activity and most efficiently promote its growth. To accomplish this great care must be taken to insure that the correct environment is established with proper quantities of nutrients and growth promoting substances present. In commercial bakeries which use large quantities of yeast, it is of utmost importance that each batch of the rehydrated yeast be of constant high quality and have a uniform high level of activity approximating that of pressed cake yeast. Only in this way can substantial uniformity be maintained for the bakery products.

It is, therefore, an object of this invention to provide an apparatus which will quickly and effectively rehydrate active dry yeast.

It is an adidtional object of this invention to provide an apparatus in which the correct environment may be established to effect the most efficient rehydration of active dry yeast.

It is another object of this invention to provide an apparatus which will operate to rehydrate consecutives batches of active dry yeast, each batch being of uniform activity and high quality.

It is still a further object of this invention to provide an apparatus which will operate to rehydrate active dry yeast only if conditions permit the establishment of the correct environment for the production of a product of high quality and of a uniform activity.

It is a still further object of this invention to provide an apparatus for rehydrating active dry yeast correctly and automatically, thereby eliminating human errors and greatly conserving manpower.

It is an additional object of this invention to provide an automatic dry yeast rehydrating apparatus which needs little attention during operation and which is completely reliable for producing consecutive batches of rehydrated yeast of uniform high quality and activity.

Other objects will be seen and a fuller understanding of the invention may be had by referring to the following description and claims taken in conjunction with the accompanying drawings.

In accordance with one embodiment of this invention the active dry yeast rehydration apparatus has a receptacle or mixing chamber which may be pressurized. A hopper is in communication with this chamber through a valve which when closed is effective to sealingly close the chamber and which when open permits the transmission of materials therethrough from the hopper into the chamber. An adjustable water delivery means is provided for delivering a preselected quantity of water into said chamber at a predetermined temperature, and a plurality of adjustable dispensing mechanisms are provided for dispensing predetermined quantities of materials including dry yeast and substances promotive of the rehydration and growth of the yeast into the hopper. One such mechanism dispenses yeast food, another enrichment wafers and another enzyme tablets. Sensing means determines whether the water delivered to the chamber is within a predetermined optimum temperature range and also determines whether sufficient quantities of materials are present in each of the dispensing mechanisms to permit the establishment of the correct restoration environment and the production of the desired rehydrated yeast product.

An adjustable control means for at least one of the dispensing mechanisms is responsive to a preselected number of signals applied thereto for effecting discharge of a predetermined volumetric quantity of material from that mechanism into the hopper upon receipt of each such signal. At least one of the other dispensing mechanisms is power actuated to dispense material therefrom at a predetermined volumetric rate, and an adjustable timing mechanism is provided for energizing this power-actuated dispensing mechanism for a preselected period of time, thus permitting a preselected quantity of material to be dispensed from the mechanism into the hopper. A valve control means responsive to a signal applied thereto effects operation of the valve to permit the passage of the dispensed materials therethrough into the chamber.

Actuation means responsive to the sensing means actuates the timing mechanism for the power-actuated dispenser and repetitively applies a signal to the mechanism control means and to the valve control means only when sufficient quantities of materials are present in the dispenser and only when water of a predetermined temperature has been delivered to the chamber.

Mixing means effects mixing within the chamber as the materials are being delivered thereto. A second valve is provided adjacent to the bottom of the chamber, and means is provided for pressurizing the chamber and for pneumatically operating the second valve after the mixing has been completed, whereby the rehydrated yeast product may be discharged under pressure from the chamber through the second valve.

In the drawings:

FIGURE 1 is a perspective view of an apparatus constructed in accordance with this invention;

FIG. 2 is a side elevation view of the mechanism for dispensing yeast and illustrating the sensing means which is employed therewith;

FIG. 3 is an elevation view of the yeast dispensing mechanism illustrated in FIG. 2 taken substantially at 90° with respect thereto;

FIG. 4 is a side elevation view partially in section of the mechanism for dispensing yeast food and illustrating the sensing means which is employed therewith;

FIG. 5 is a sectional elevation view of the yeast food dispensing mechanism taken substantially along line 5—5 of FIG. 4;

FIG. 6 is a sectional view of the yeast food dispensing mechanism taken substantially along line 6—6 of FIG. 4;

FIG. 7 is a side elevation view partially in section of the mechanism for dispensing enzyme tablets;

FIG. 8 is an end elevation view of the enzyme tablet dispensing mechanism taken partially in section substantially along line 8—8 of FIG. 7;

FIG. 9 is a top plan view of the apparatus for dispensing enrichment wafers;

FIG. 10 is a side elevation view partially in section of the enrichment wafer dispensing mechanism;

FIG. 11 is a sectional elevation view of the enrichment wafer dispensing mechanism taken substantially along line 11—11 of FIG. 10;

FIG. 12 is a perspective view of the detection means which determines when the cover member is in locked position to effectively seal the pressurizable mixing chamber;

FIG. 13 is a diagram of the portion of the electrical wiring employed with the apparatus constructed in accordance with this invention;

FIG. 13A is the diagram of the remainder of the electrical wiring employed in the apparatus;

FIG. 14 is a diagram of the wiring of one of the timing mechanisms illustrating the position of the internal switches thereof when the mechanism is in its "off and reset" position;

FIG. 15 is a diagram of the wiring of one of the timing mechanisms illustrating the position of the internal switches thereof during "timing"; and FIG. 16 is a diagram of the wiring of one of the timing mechanisms illustrating the position of the internal switches thereof when the mechanism is in its "timed out" position.

The rehydration apparatus 20 illustrated in FIG. 1 is particularly adapted for use in connection with an assembly line in a large bakery and may be connected directly to the dough mixers. This device will automatically rehydrate yeast in an environment which will most properly promote the growth and activity of the yeast. Each batch of rehydrated yeast is prepared in accordance with the desires of the bakery and once the desired product has been produced with the apparatus, identical rehydrated yeast products may be prepared in batch quantities, merely by pressing the start button on the apparatus.

As best illustrated in FIG. 1, the apparatus 20 has a frame consisting of four vertical frame members or legs 22, 24, 26 and 28. A cylindrical pressure vessel 30 is positioned centrally within the frame and is connected to the vertical frame members by means of radial webs or braces 32. A top lid or cover 30b is attached to the receptacle or bottom portion 30a of the pressure vessel by means of a hinge 30c. When in its closed position, as illustrated in FIG. 1, lid 30b and receptacle portion 30a of the pressure vessel are in sealing engagement. As illustrated in FIGS. 1 and 12, a lid latch 34 is provided to lock the lid 30b in its closed position.

The lid latch 34 is pivotally mounted on a block 34a which is attached to the receptacle portion 30a of the pressure vessel 30. See FIG. 12. A stop plate 34b is attached to block 34a. When swung by handle 34c into the illustrated position, the arm 34d of the latch will engage the lid 30b of the pressure vessel, and the arm 34e will engage stop plate 34b. An air cylinder 35 pneumatically connected to the pressure vessel 30 by means of a pneumatic line 35a has a lock pin 35b which is raised behind arm 34e of the lid latch when pressure is applied to the vessel 30 and to the cylinder 35. A switch 36 having an operating button 36a in constant engagement with latch 34 is in a normally open position except when the latch 34 is in its illustrated closed position. In this position, the latch fully depresses the operating button 36a of the switch and closes the switch, thus this switch in effect senses the position of the latch 34 and the circuit is completed through the switch only when the latch 34 is completely closed. Lock pin 35b prevents the movement of the latch toward its open position during the period when the mixing vessel is pressurized.

Connected centrally to the bottom of the pressure vessel 30 is a discharge valve 37 which is operated by means of a pneumatic cylinder 38 having a moving piston rod 39. The piston rod 39 is connected to the discharge valve 36 by means of a lever 40. The discharge valve 37 is normally in a closed position and is opened at the proper time by the application of a pneumatic pressure to pneumatic cylinder 38. A duct 42 of substantially cylindrical cross section is welded to and extends upwardly at an oblique angle from the side of the body portion 30a of the pressure vessel. A motor 44 is attached with a sealed connection to the upper extremity of the duct 42, and a drive shaft 46 attached to and driven by motor 44 extends axially through duct 42 into the pressure vessel 30. Attached to the end of drive shaft 46 are radial agitation blades 48. A second substantially cylindrical duct 50 is welded to the side of pressure vessel 30 approximately 90° from duct 42, and this second duct also extends upwardly at an angle with respect to the axis of the pressure vessel. Sealingly attached to the outer end of the duct 50 is a feed or hopper valve 52 which has a hopper 54 connected thereto. Valve 52 is a normally closed butterfly valve, which in its closed position effectively seals duct 50. This valve is operated by means of a pneumatic cylinder 56, the movable piston rod 58 of the cylinder being pivotally connected to the operating lever 60 of the valve 52. Pressure applied to the pneumatic cylinder 56 causes the opening of the valve 52, and as will be more fully described, this permits the movement of materials from the hopper 54 into the pressure vessel. With the discharge valve 37 and the feed valve 52 in their normally closed positions and with cover 30b locked in its closed position by means of the latch 34, the pressure vessel 30 is completely sealed.

Mounted on the upper ends of vertical support members 22, 24, 26 and 28 is a water tank 64. The pipe line 66 in communication with the bottom of tank 64 is adapted to supply fresh water to the tank, and a second hydraulic line 68 is adapted to conduct water from tank 64 to the pressure vessel 30 through a filter mechanism 70, a pressure regulator 72 and a pipe 74. A pair of thermostatically controlled heating elements 76 and 77 extend within receptacle 64 and are adapted to heat the water contained therein to within a predetermined temperature range.

A control panel 78 is mounted between vertical support members 22 and 26 intermediate the water tank 64 and the pressure vessel 30. Most of the various controls and indicating elements for the apparatus 20 are mounted on this control panel. Mounted on a supporting platform 80 which is connected to frame members 26 and 28 are four dispensing mechanisms. Mechanism 81 is adapted to hold active dry yeast and to dispense volumetric quantities thereof into the hopper 54. Mechanism 84 is adapted to hold yeast food and to dispense the yeast food at a predetermined rate into hopper 54. Mechanism 86 is adapted to hold a plurality of enzyme tablets and to dispense these tablets in the desired quantities into the hopper 54, and mechanism 88 is adapted to hold a plurality of enrichment tablets or wafers and to dispense predetermined quantities of these into the hopper 54. The operation of each of these mechanisms will now be described in detail.

The yeast dispensing mechanism 81 is best illustrated in FIGS. 2 and 3 and comprises a receptacle 90 which is of substantially cylindrical cross section and has a flat, downwardly sloping bottom 92. A lid 94 is hinged to receptacle 90 to cover the top opening through which the receptacle is charged. A rectangular aperture is cut in the side of receptacle 90 adjacent the lowest part of the receptacle bottom. A substantially cylindrical housing 96 is connected to the side of the receptacle 90 with the transfer chamber portion 98 thereof disposed about the aperture in the receptacle 90 and thus is in communication with the interior of the receptacle. Mounted for reciprocal movement within the housing 96 and the transfer chamber is a rod 100 which is threaded at its upper end and which has a plunger 102 fixed to its lower end. The upper end of the rod 100 is threadedly connected to the piston rod 104 of an air cylinder 106 by means of a coupling nut 108. The piston 110 to which rod 104 is connected is mounted for reciprocal movement within cylinder 106, and air lines 112 and 114 disposed at opposite ends of cylinder 106 provide the means for operating and reciprocating the piston within the cylinder.

Threaded on the rod 100 below the coupling nut 108 for reciprocal movement within the transfer chamber 98 is a metering cylinder 116 which, except for the apertures in the ends thereof through which the rod 100 extends, is closed at both ends. The metering cylinder 116 may be vertically adjusted and positioned on the threaded rod 100 by rotating it relative to the rod 100. For this purpose openings are preferably provided in the sides of the housing 96. Radial set screws 116a in the upper end of the metering cylinder may be tightened to lock the metering cylinder in position with respect to rod 100 after the adjustment has been made. The lower end 116b of the cylinder 116 is centrally recessed to provide an annular knife edge thereat which will prevent jamming as the cylinder is reciprocally moved.

In the illustrated position, the piston 110 is in its highest or retracted position, and the active dry yeast is permitted to flow freely through the aperture in the lowermost part of receptacle 90 into the transfer chamber 98 and circumjacent rod 100 between the top of plunger 102 and the bottom of metering cylinder 116. The lower end 98a of the transfer chamber 98 is restricted and slidably accommodates the plunger 102. Plunger 102 never is raised above the restricted lower portion 98a of the chamber but rather when retracted, as illustrated, it serves to prevent the passage of dry yeast from the transfer chamber 98. The metering cylinder 116 is concentric with and of substantially the same diameter as the plunger 102 so that it too may be slidably moved into the lower end of the transfer chamber. At the proper time in the cycle of the machine, air is forced in through conduit 112 to drive piston 110 downwardly in cylinder 106 carrying with it the interconnected rods 100 and 104. Plunger 102 is carried downwardly on the end of the rod 100 through the restricted portion 98a of chamber 98, the downward movement continuing until the metering cylinder 116 also is forced into the restricted portion 98a of chamber. At the end of the downward or dispensing stroke of the piston 110 plunger 102 will be in position below the restricted portion 98a of transfer chamber and within the enlarged upper end of the yeast spout 118, and the metering cylinder 116 will be partially within the restricted portion 98a to prevent further movement of dry yeast from the transfer chamber. At this point, the dry yeast which had been carried between plunger 102 and metering cylinder 116 into the restricted portion 98a of the transfer chamber is permitted to drop from the chamber into the spout 118. Metering cylinder 116 is sufficiently long to prevent the dry yeast in chamber 98 from interfering with the return or upward stroke of the piston and the plunger. Preferably a portion of the cylinder 116 still remains above the transfer chamber 98 at the end of the downward piston stroke. This keeps the transfer chamber closed and also insures that the cylinder will be guided throughout its entire reciprocal movement. The close fit between the restricted portion of the transfer chamber 98 and the plunger 102 and the metering cylinder 116 assures that the yeast will be metered correctly, and the distance between the top end of plunger 102 and the bottom end of the metering cylinder is determinative of the amount of yeast which is discharged with each stroke of the plunger and metering cylinder. This distance can be varied by adjusting the metering cylinder upwardly or downwardly on rod 100 as previously described, although this distance must not be greater than the height of the restricted portion 98a of the transfer chamber.

Sensing means is provided for determining whether sufficient yeast is present in receptacle 90 to form the desired rehydrated product. This sensing means preferably comprises a mercury switch 120 which is normally open to interrupt the flow of electrical current therethrough. The position of this switch is determined by means of a paddle 122 and a counterweight 123 which are mechanically connected to the switch through a shaft 124. The weight of dry yeast on paddle 122 will cause the paddle and the shaft 124 to rotate into a position to close the switch 120. If there is insufficient dry yeast on paddle 122, which only occurs when there is insufficient dry yeast in the receptacle 90, the paddle, the shaft 124 and the switch 120 will return to their normal positions under the influence of a spring or counterweight and the flow of current through the switch will again be interrupted. Thus, only if there is sufficient dry yeast in receptacle 90 will switch 120 be closed. The paddle 122 is so positioned in receptacle 90 that it will effectively close switch 120 only so long as there is at least enough dry yeast in the receptacle 90 to produce a maximum rehydrated batch product, i.e., when there is at least 10 pounds of dry yeast in the storage receptacle.

The dispensing apparatus 84 for dispensing yeast food into the hopper 54 is best illustrated in FIGS. 4, 5 and 6. This dispensing mechanism includes a substantially rectangular storage receptacle 130 having a removable cover or lid 132. The bottom of receptacle 130 is open, and attached thereto is a hopper 134, two opposing sides of which slope downwardly (see FIG. 5). Connected below the hopper 134 is a substantially cylindrical member 136 which extends laterally outward from the hopper 134. Material deposited in the receptacle 130 will move freely downwardly through the hopper 134 into the cylindrical member 136.

An elongate auger 138 is disposed within and is adapted to transport the material laterally through cylindrical member 136. One end of the shaft 138a of the auger is journalled in and extends through the plate 139 forming one end of the hopper 134 and of the cylindrical member 136. The opposite end of the auger shaft 138a may be journalled in a perforated plate or screen 140 mounted at the outer end of the cylindrical member 136. Also journalled in and extending through the hopper end plate 139 above the auger shaft 138a is a second shaft 141, and a hollow rectangular agitator 142 is attached thereto. A synchronous motor 144 operates at a uniform speed and is connected by means of gears 145, 146 and 146a to a gear 147 which is keyed to the shaft 138a of the auger. It will be noted that this is a reduction gearing so that the shaft 138a of the auger operates at a substantially slower speed than synchronous motor 144. A small gear 147a also mounted on the shaft 138a of the auger is in engagement with a large gear 148 which is mounted on the shaft 141 to which the agitator paddle 142 is connected. Thus, the motor 144 operates both the auger 138 and the agitator 142 with the latter operating at a lower speed than the former. The gears are all mounted within the housing 150.

A sensing means is also provided in dispenser 84 for determining whether sufficient yeast food is present in this dispenser to permit the proper environment to be established for the yeast. For this purpose, a mercury switch 152 is provided which is normally open. This switch is attached to a lateral shaft 154 which extends through the side of receptacle 130, and a paddle 156 and a counterweight 158 are affixed to the opposite end thereof within the receptacle. The paddle 156 and the shaft 154 are so positioned in the receptacle 130 that if insufficient yeast food material is present in the receptacle, the paddle will not be covered and the switch 152 will be urged toward its normally open position by the counterweight 158 interrupting the flow of electrical current therethrough. If on the other hand, sufficient yeast food material is in receptacle 130, the paddle 156 will be covered and this paddle and shaft 154 will be rotated in a direction which will close the switch 152 completing the circuit therethrough.

The agitator 142 maintains the yeast food in a state of agitation within hopper 134 and permits the free movement of this material into the cylindrical member 136 for transportation therethrough by auger 138. The material is moved by auger 138 to the left in FIG. 4 through the screen 140 at the opening in the extremity of cylindrical member 136 and above hopper 54. As the material is transported through the screen 140, it drops into the hopper for subsequent movement into the pressure vessel 30.

The enzyme tablet dispenser 86 is best illustrated in FIGS. 7 and 8. The enzyme tablets are in the shape of discs, each constituting a predetermined volumetric quantity of the enzyme. It is the purpose of the dispenser 86 to hold these tablets and to dispense a preselected number of them into the hopper 54 so that the proper environment may be established within the mixing chamber 30 for the growth and rehydration of the yeast. Dispenser 86 has a thin receptacle portion 166 which is of substantially rectangular cross section and is just wide enough to accommodate the enzyme tablets in one vertical layer or plane. The infeed section or top 168 of this portion is slightly distended to facilitate the charging of tablets into the dispenser.

The bottom of the receptacle portion 166 is formed in two sections 170 and 172. The first section 170 is fixed in position, and the second section 172 is pivotally movable about a pin 172a adjacent the fixed section 170. The bottom sections 170 and 172 slope downwardly and extend across the receptacle from one side thereof to adjacent the opposite side thereof, and the movable bottom section 172 has a leg 172b depending from adjacent its free end the purpose of which will be hereinafter described. The free end of the pivotally movable bottom section 172 is spaced from the side of the dispenser to form an outlet just large enough to permit the passage of the enzyme tablets in a single vertical row therethrough. A vertical guide member 174 maintains the enzyme tablets in a vertical row after they have passed the end of movable bottom section 172 of the receptacle 166. A baffle 176 is disposed in receptacle 166 above the movable bottom section 172 and the adjacent outlet to prevent excessive tablet load on the movable section 172, to allow better agitation of the tablets and to prevent the tablets from falling directly into the outlet and being accidentally dispensed when they are being initially charged into the dispenser.

Below vertical guide member 174 an aperture 180 is cut in the end wall of the dispenser, and the enzyme tablets are adapted to be discharged through this aperture 180 into one end of a chute 182, the opposite end of which terminates above hopper 54 associated with the pressure vessel 30. Mounted in fixed position on a horizontal base plate 184 of the dispenser is a horizontal guide 186 having a recess 188 formed therein below the receptacle outlet, i.e., below the space between the side of the dispenser and vertical guide 174. Recess 188 is substantially semi-circular in shape and is adapted to accommodate the bottom portion of an enzyme tablet and functions as a stop to prevent the tablets from accidentally rolling laterally through the discharge aperture into the chute 182.

A horizontally disposed discharge plunger 190 is mounted on the guide 186 below the vertical guide 174 for horizontal movement toward and away from the opening 180 in the dispenser. The plunger has a protuberant block 192 attached to its upper surface. This block 192 moves laterally with plunger 190 and is adapted to engage the depending leg 172b of the movable bottom section 172 of the receptacle. Each time plunger 190 is moved toward the opening 180 in the dispenser, a tablet is moved from the recess 188 in the guide plate 186 through the discharge opening and into the chute 182. Simultaneously, the protuberant block 192 attached to and carried by the plunger engages the depending leg 172b of the movable bottom portion 172 of the dispenser receptacle causing this movable bottom portion 172 to pivot about pin 172a. This movement in effect causes agitation of the tablets within the receptacle 166 each time a tablet is dispensed and prevents jamming of the tablets in the dispenser.

One end of an operating link 194 is fixed to a pivot pin 196, and the opposite end of this link is pivotally connected to the discharge plunger 190. Also fixed to the pivot pin 196 is a second link 198, and a spring 200 acting between the frame of the dispenser and the free end of link 198 urges the links 194 and 198 in the clockwise direction, as viewed in FIG. 7. The movable core 202a of a solenoid 202 is connected to the free end of link 198 by means of a connecting arm 204. In FIGS. 7 and 8 the solenoid 202 is in its normal position. When the solenoid 202 is energized, the movable core 202a moves downwardly pulling the arm 204 downwardly with it and causing counterclockwise rotation of links 194 and 198 and lateral movement of discharge plunger 190 (to the left in FIG. 7) toward the opening 180 for the discharge of one of the enzyme tablets. Spring 200 serves to retract the plunger 190 and the associated links 194 and 198 when the solenoid 202 is subsequently de-energized. Each time solenoid 202 is energized, an enzyme tablet is thus discharged through the opening 180 into the chute 182 and the enzyme tablets in the receptacle 166 are agitated by the pivotal movement of bottom member 172, as previously described.

Means is provided for detecting whether sufficient quantities of the enzyme tablets are present in the dispenser 86 to provide the proper environment for the growth and rehydration of the yeast. For this purpose a mercury switch 204 is provided. This switch is mounted on a horizontal shaft 206 which is pivotally movable with respect to the receptacle 166. Also fixed to pivotal shaft 206 are counterweights 208 and 208a. Shaft 206 extends laterally inwardly through the side of receptacle 166, and within the receptacle a substantially L-shaped indicator arm 210 is fixed to this shaft and extends downwardly therefrom. A covering shield 212 protects the end of the pivotal shaft 206 within the receptacle. The lower end 210a of the indicator arm 210 extends transversely, and when there are enzyme tablets in the receptacle 166, their weight applied to this transverse end 210a causes the indicator arm 210 and the horizontal shaft 206 to be pivoted to the position illustrated in FIGS. 7 and 8. If the number of tablets in the receptacle 166 is insufficient to permit the establishment of the desired and proper environment within the pressure vessel 30, the tablets will not bear against the end of the indicator arm 210, and the arm and the shaft 206 to which the arm is connected will move clockwise under the influence of counterweights 208 and 208a. This movement of shaft 206 causes the opening of the mercury switch 204. In the position illustrated in FIGS. 7 and 8 the mercury switch is closed, and the circuit in which this switch is located is therefore completed. If there is an insufficient quantity of enzyme tablets in the receptacle, the switch is pivoted to its open position by the counterweights, and the circuit in which the switch 204 is located is opened.

The mechanism 88 for dispensing enrichment or wafers is best illustrated in FIGS. 9, 10 and 11. The enrichment tablets or wafers are thin substantially square wafers or tablets of compressed enrichment material. The dispenser 88 includes a receptacle 218 which is divided into five receptacle sections or magazines 218a, 218b, 218c, 218d and 218e. At the bottom of each magazine is a rectangular discharge slot 220, best illustrated in FIG. 10. The enrichment wafers or tablets are dispensed individually from their respective magazines through their respective slots 220 into the chute 182.

As best illustrated in FIG. 11 each magazine has a bottom guide plate 222 disposed level with the bottom of the slot 220 in the magazine, and each magazine has associated therewith a slide bar or plunger 224 which slides laterally on the guide plate 222 toward and away from the slot 220 in the magazine. This is best illustrated in FIG. 11. Each time one of the slide bars 224 moves to the left in FIG. 11 it forces one of the enzyme tablets from the magazine with which the bar is associated, out of the respective aperture 220, and into the chute 182.

In order to effect the sliding discharge movement of the slide bars 224 in each of the magazines, there are provided five solenoids 226, 228, 230, 232 and 234. The solenoid 226 is operatively connected to the slide plate 224 in the magazine 218a by means of a lever 236. A spring 238 acting against lever 236 urges the slide bar rearwardly away from the slot 220 in the magazine. The solenoid 228 is operatively connected to the slide bar 224 in the magazine 218b by means of a lever 240, and a spring 242 acting against lever 240 resiliently urges the slide bar rearwardly away from the slot 220 in that magazine. The solenoid 230 is operatively connected to slide bar 224 in magazine 218c by means of lever 246, and a spring 248 acting against lever 246 resiliently urges the slide bar rearwardly away from the discharge slot in that magazine. Similarly, the solenoid 232 is operatively connected to the slide bar associated with magazine 218d by means of a lever 250, and a spring 252 acting against the lever resiliently urges the slide bar rearwardly away from the discharge slot in that magazine. Solenoid 234 is operatively connected to the slide bar 224 associated with magazine 218e by means of a lever 254 and is adapted to move that slide bar toward the slot in that magazine against the resistance of the spring 256.

The levers 236, 240, 246, 250 and 254 are all pivotally mounted on a shaft 260 which is journalled in the sides of the dispenser 88. Levers 236, 246, and 254 are substantially L-shaped, and the solenoids 226, 230 and 234 operating these levers respectively are mounted below one of the arms thereof, best illustrated in FIG. 11. As the solenoids are actuated, the L-shaped levers are pivoted counterclockwise, as viewed in FIG. 11, about shaft 260 causing the movement of the slide bars 224 to the left in FIG. 11 toward the discharge slots 220 in their respective magazines. This pivotal movement of levers 236, 246 and 254 is accomplished against the resistance of their respective return springs 238, 248 and 256, and when the solenoids 226, 230 and 234 are de-energized, these return springs effect movement of the lever members and the slide bars toward their normal position, as illustrated in FIG. 11.

Lever members 240 and 250 are substantially straight, and the solenoids 228 and 232, which respectively operate these levers, are disposed between the ends of the levers. The upper ends of the levers 240 and 250 are connected to the respective slide bars in the associated magazines and the lower end of each lever is connected to its return spring which resiliently urges the lever in a clockwise direction about the axis of shaft 260, as illustrated in FIG. 11. Thus, this spring urges the slide bar 224 to the right in FIG. 11 toward its rest position. When the solenoids 228 and 232 are energized, the rectilinear lever members 240 and 250 are respectively pivoted about the axis of shaft 260 to cause the movement of slide bars 224 in the magazines 218b and 218d toward the discharge slots therein against the resistance of springs 242 and 252, respectively. Thus, each time one of the five solenoids is energized, the slide bar associated with that solenoid is caused to move toward the opening in the associated magazine to effect the discharge of an enrichment tablet from that magazine.

Means is also provided for determining whether sufficient quantities of the enrichment tablets are present in each of the magazines to permit the establishment of the proper and desired environment within the pressure vessel 30 for the rehydration and restoration of the yeast. For this purpose, five identically constructed switches 262, 263, 264, 265 and 266 are provided, one switch for each magazine. These switches are connected in series and each may comprise a fixed contact 267 and a movable contact 268 which are normally open. The movable contact preferably has an insulated element 268a connected thereto and extending through the wall of the associated magazine into engagement with a thin plate 269 which is pivotally mounted on the magazine wall. When the tablets are in position within the magazine, they will bear against the thin plate 269 which in turn presses on the insulated element 268a to bring the movable contact 268 into engagement with the fixed contact 267. If there is insufficient quantity of the tablets in any one of the magazines, the switch associated with that magazine opens, thus opening the circuit within which the switches are placed.

The electrical circuit diagram of the apparatus 30 is illustrated in FIGS. 13 and 13A. The operation voltage for the apparatus is 220 volts, 60 cycle, 3 phase current. Operating directly from this 3 phase line through the thermostatic relays 76a and 77a, respectively, are the heating elements 76 and 77 for the water tank 64. Also operating directly from the 220 volt line is the yeast food motor 144 and the mixer motor 42. These two motors are connected in the line through normally open relays, the operation of which will be hereinafter described. The remainder of the circuit is operated from the secondary of the step-down transformer 270.

The flow of water from the tank 64 into the pressure vessel 30 is controlled by means of a water timer control 272. The discharge of enzyme tablets from dispenser 86 into the hopper 54 is regulated by means of counter control 274. The discharge of enrichment wafers from dispenser 88 into the hopper is regulated by the counter control 276. The discharge of yeast from the yeast dispenser into the hopper 54 is regulated and controlled by counter 278. The discharge of yeast food from the yeast food dispenser 84 is regulated by the timer control 280. The mixing in the pressure vessel is regulated by a timer control 282, and the discharge of the rehydrated yeast product from the pressure vessel 30 through valve 37 is regulated by means of timer control 284. The timers 272, 280, 282 and 284 as well as counters 274, 276 and 278 are all located on the control panel 78, as illustrated in FIG. 1.

As previously indicated, the timers and counters are in the circuit of the secondary of the transformer 270 which steps the voltage down from 220 volts to 110 volts. A fuse 290 is placed in this secondary circuit between the transformer and the common bus 292. A high resistance neon light 294 may be placed in parallel with this fuse 290 so that if the fuse should open, the current flowing in the secondary circuit will cause the neon light to energize thereby informing the operator of the defect. This neon light 249 also may be located on the control panel 78.

Connected to the opposite side of transformer 270 is the valve control switch 296, which may be moved between an "automatic" and an "open" position. In normal operation this control is in its "automatic" position and is only moved to its "open" position to effect cleaning of the apparatus, as will be hereinafter described.

When in its normal or "automatic" position, as illustrated in FIG. 13, the control valve connects line 298 into the secondary circuit of transformer 270. When in the "open" position, the line 300 is connected into the secondary circuit of the transformer. A normally open cycle start switch 302 and a sensing system 304 are in series between the "automatic" normally energized line 298 and the water timer control 272. The sensing system 304 comprises the detection switch 120 on the yeast dispenser, the detection switch 152 on the yeast food dispenser, the detection switch 204 on the enzyme dispenser, the detection switches 262, 263, 264, 265 and 266 on the enrichment wafer dispenser, and the detection switch 36 on the lid latch mechanism. As previously indicated with each of these switches, they are normally open. The detection switches on the dispensers are closed by the presence of the proper quantities of materials in the respective dispensers, and the cover switch 36 is closed when the lid latch is in its completely latched position. In parallel with each of these detection switches is a neon light of high resistance. Light 306 is disposed across the switch 120 in the yeast detection circuit; neon light 308 is disposed across switch 152 in the yeast food detection circuit; neon light 310 is disposed across switch 204 in the enzyme tablet detection circuit; light 312 is across series connected switches 262, 263, 264, 265 and 266 in the enrichment wafer detection system; and neon light 314 is across switch 36 in the lid latch detection system. With proper quantities of yeast, yeast food, enzyme tablets and enrichment wafers in the respective dispensers for these materials and with the cover properly latched, switches 36, 120, 152, 204, 262, 263, 264, 265 and 266 will all be closed, and the circuit will be completed between the water timer 272 and "automatic" line 298 when the cycle start switch 302 is depressed. If on the other hand, one of the detection switches is open, the current must flow through the high resistance neon light which is in parallel with that switch, and the voltage drop across that light is sufficient to prevent the energization of the water timer 272. Thus, in effect, the water timer can be initially energized only when the pressure vessel cover is latched and when there is sufficient yeast, yeast food, enzyme and enrichment materials in their respective dispensers to produce the desired and required environment for the maximum batch of rehydrated yeast.

The timers 272, 282 and 284 are identical and of well-known construction, each employs a synchronous motor 320, a clutch solenoid 324, a pair of primary switches 326 and 328 and a pair of secondary switches 330 and 332. The operation of the water timer 272 is illustrated in FIGS. 14, 15 and 16, and the other timers operate in a very similar manner. Timer 272 has four exterior contacts A, C, G and H and two interior contacts B and D. The solenoid clutch 324 is connected between exterior terminals A and H. The line which is to initially energize the timer is connected to terminal A, and terminal H of the timer is connected to common bus 292. In FIG. 14 the timer is illustrated in its "off and reset" position, in which terminals A and B are electrically connected by switch 326 and in which terminals C and D are interconnected by primary switch 328. Upon the application of voltage to terminal A of the timer, the solenoid clutch 324 will be energized. This causes the movement of secondary switches 330 and 332 from the position illustrated in FIG. 14 to the position illustrated in FIG. 15 in which the "holding" circuit is completed from automatic line 298 through terminals C and D of the discharge timer 284 through holding line 337 and through terminals F, B and A of the water timer 272. See FIGS. 13 and 13A.

The circuit is also completed from automatic line 298 through terminals C, D and G to the synchronous motor 320. The synchronous motor 320 operates a trip which may be properly positioned in the usual and well-known manner by means of a pointer-indicator. After the synchronous motor has been on for the desired period of time depending upon the setting of the trip and the pointer-indicator, the switches 326 and 328 are mechanically tripped to the "timed out" position illustrated in FIG. 16 in which the switch 328 electrically interconnects terminals C and E. Note in the "timed out" position illustrated in FIG. 16 that the solenoid clutch 324 is still energized but that the movement of the primary switch 328 has de-energized the synchronous motor 320. The timer switches remain in the position illustrated in FIG. 16 until the signal to the clutch 324 is interrupted whereupon the clutch disengages and both the primary and secondary switches are resiliently returned to the "off and reset" position illustrated in FIG. 14.

Referring again to FIG. 13, when the proper quantities of yeast food, enzyme and enrichment materials are present in each of the dispensers, and when the cover is closed, the water timer 272 may be energized by depressing the cycle start button 302. This causes a signal to be applied to terminal A of the water timer and energizes solenoid 324 causing the secondary switches 330 and 332 to move to their upward position as illustrated in FIG. 15. This energizes the synchronous timing motor 320 as previously described. The clutch 324 is held in by the "holding" circuit through the discharge timer 284, permitting the release of the button on cycle start switch 302. The solenoid of the water valve 336 connected in parallel with synchronous motor 320 is simultaneously energized, and this valve controls the flow of water from the water tank 64 into the pressure vessel 30. When the solenoid in valve 336 is energized, the valve opens and water is permitted to move into the pressure vessel 30 from the water tank 64.

The control from the synchronous motor 320 is set for a predetermined period of time as previously indicated, and after the synchronous motor has run for its preset period of time, the primary switches 326 and 328 are tripped to the "timed out" position illustrated in FIG. 16, breaking the circuit through motor 320 and through the solenoid of the water valve 336.

Connected in series between terminal E of the water timer and the common bus 292 are two thermostatic relays 338 and 340 and a relay control 342. Thermostatic relay 338 and thermostatic control 340 are operated by temperature sensing devices such as thermocouples which are located in the pressure vessel 30 to detect the temperature of the water therein. Relay 338 is normally open and is adapted to close if the temperature in the vessel is above 95° F., and thermostatic control relay 340 is normally closed and is adapted to open if the temperature of the water in the vessel is above 110° F. Thus, the circuit from terminal E of the water timer through the solenoid-operated relay control 342 is complete only when the temperature of the water in the pressure vessel 30 is between about 95° F. and about 110° F., for only under these circumstances both thermostatic relays 338 and 340 will be closed.

In parallel with the circuit consisting of relays 338 and 340 and relay control 342 is a second circuit consisting of the normally-closed relay 342a and an alarm system 344 which are connected in series. Alarm system 344 includes a light 345 and a transformer 346 in parallel therewith, the secondary of the transformer being connected to a bell 348. A clutch activation line 350 is also connected to terminal E of the water timer 272 through a normally-open relay 342b. Relays 342a and 342b are operated by relay control 342. When the relay control is energized, the normally-closed solenoid 342a will open and the normally-open solenoid 342b will close. Thus, when the switch 328 of the water timer is moved to its "timed out" position into engagement with terminal E, if the water in the pressure vessel 30 is within the prescribed temperature range of between about 95° and about 110° F., the relay control 342 and the clutch activation line 350 will both be energized. If on the other hand, the temperature of the water in the pressure vessel is not within the prescribed temperature range, neither the relay control 342 nor the clutch activation line 350 will be energized, the relay 342a will not be opened and the circuit will be completed through the alarm system 344 including the light 345 and the bell 348. The operator is thus immediately informed of the defect and can take proper steps to correct it. The rehydration of the active dry yeast will not proceed until the water is brought to the correct temperature.

A pulse motor 352 is connected between pulse activation line 350 and the common bus 292, and when line 350 is energized the pulse motor is also energized. The pulse motor has three pulse sections 350a, 350b and 350c (see FIGS. 13 and 13A), the operation of which will be hereinafter more fully described.

The clutches of each of the counters and of the yeast food and mixer timers are connected across the circuit between clutch activation line 350 and common bus 292. Thus, when the clutch activation line 350 is energized as previously described, that is, when water at the proper temperature has been delivered to the pressure vessel 30, the clutches of these timers and counters will be energized.

Clutch activation line 350 is connected to terminal C of the mixer timer 282, and when that timer is in the normal or "off and reset" position, the switch 328 of that timer will complete the circuit to synchronization line 354 through terminals C and D and through a normally closed relay 356a and section 350a of the pulse motor.

As best seen in FIG. 13, when synchronization line 354 is energized, the relay control solenoid 356 will also be energized through section 350b of the pulse motor to open the normally-closed relay 356a and to close the normally-open relays 356b, 356c and 356d. Relay 356c is shunted across the portion of the circuit containing the relay 356a and the commutator section 350b of the pulse motor. (See FIG. 13A.) Thus, once synchronization line 354 and the solenoid control 356 are energized they remain energized due to the closing of relays 356b and 356c.

Synchronization line 354 is also connected to a pulse line 360 through the section 350c of the pulse motor and through relay 356d operated by relay control 356. The pulse motor section 350c repetitively interrupts the circuit between line 354 and line 360 thus causing a pulse signal in line 360. As will be seen the counting mechanism in each of the three counters as well as the dispensing mechanisms associated with those counters are actuated from the pulse line 360.

When water has been delivered to the pressure vessel 30 at the proper temperature, clutch activation line 350 is energized which causes the simultaneous energization of clutch 364 in the tablet counter, clutch 366 in the wafer counter and clutch 368 in the yeast counter. Each of these clutches engages its respective counting mechanism and closes its associated relay switch. Clutch 364 in the enzyme tablet counter 274 closes relay switch 364a completing the circuit from pulse line 360 through the solenoid 202 of the enzyme tablet dispenser 86. The pulses from pulse line 360 are thus applied directly and simultaneously to the solenoid 202 of the enzyme tablet dispenser and to the counting solenoid 370 in the enzyme tablet counting mechanism. Counting mechanisms such as employed with this apparatus are of well-known construction and operation. The counting solenoid 370 may operate a ratchet or pawl which when clutch 364 is activated engages a ratchet wheel or spur and the spur is rotated through a given angle by each stroke of the ratchet. Thus, each time a pulse is applied to the solenoid 370, the ratchet moves one stroke and the counting spur is rotated through its given angle. A tripping element on the spur, which may be set in accordance with the number of pulses desired for the dispenser solenoid 202, trips open the relay 364a interrupting the circuit between the pulse line 360 and solenoid 202 of the enzyme tablet dispenser. Thus, the enzyme tablet counter 274 connects solenoid 202 to pulse line 360 for a preselected number of pulses, whereupon the solenoid is again de-energized. Each time a pulse is applied to solenoid 202, an enzyme tablet is dispensed from dispenser 86.

The operation of the enrichment wafer counter 276 is quite similar. The clutch 366 is energized through activation line 350 when water at the proper temperature is in the pressure vessel 30. Clutch 366 when energized engages its counting mechanism and closes the relay 366a to complete the circuit from the pulse line 360 through a stepping relay control 374. The application of pulses to relay control 374 effects the alternate opening and closing of relay contacts 374a, 374b, 374c, 374d and 374e through a series connected relay blocking switch 374f to operate the solenoids 226, 228, 230, 232 and 234, respectively, of the enrichment wafer dispenser 88. Each time a pulse is received by the stepping relay control 374, the relay blocking switch 374f is closed, one of the relay contacts is closed and another of the relay contacts is opened. One of the five relay contacts is always closed, and when relay control 374 is first energized through the application of the first pulse thereto, it will effectively close the next relay contact, which in this case is contact 374b, and will open the previously closed contact, which is 374a. The next pulse to relay control 374 will effect closing of relay contact 374c and opening of relay contact 374b and so on. Thus, each time a pulse is applied to the relay control 374, an enrichment tablet will be dispensed from one of the five magazines in the dispenser 88. The relay blocking switch 374f prevents operation of the closed relay contact from pulse line 360 unless and until the control 374 is simultaneously energized. When the desired number of pulses have been applied to relay control 374 and to the ratchet operating counting solenoid 375 which is in parallel therewith, relay 366a is tripped open and relay control 374 is de-energized, terminating the dispensing of wafers from dispenser 88.

In a similar manner when the clutch 368 of the yeast counter 278 is energized by activation line 350, the counting mechanism is engaged and the relay 368a closes to complete the circuit between pulse line 360 and the solenoid actuated valve 376. Solenoid valve 376 governs the application of air to cylinder 106 operating the yeast dispensing mechanism 81. In its normal position with no voltage applied thereto, the valve 376 is effective to apply a pneumatic pressure to the cylinder through line 114 of the air cylinder 106, but when valve solenoid 376 is energized by a pulse from pulse line 360 the valve reverses and causes the pneumatic pressure to be applied to the cylinder through line 112 causing the downward or dispensing stroke of the plunger 102 and the metering cylinder 116 in the dispensing mechanism. At the end of each pulse the valve returns to its normal position and the plunger 102 and the metering cylinder are drawn upwardly.

Connected in parallel with solenoid valve 376 in the pulse circuit between relay 368a and the common bus 292 is the solenoid actuated valve 381 which governs the application of air to the cylinder 56 to operate the hopper valve 52. Pulses from line 360 are fed into solenoid of valve 381 through relay 368a causing valve 52 to repetitively oscillate between a closed and an opened position. It has been found that this oscillation of the hopper valve facilitates the free flow of dispensed material from the hopper 54 throuh the valve and into the pressure vessel 30. The solenoid of valve 381 is also connected to line 300 and part of the hopper valve control switch 296 is located between the relay 368a in the yeast counter 278 and the solenoid of valve 381. When control switch 296 is moved from its "automatic" position into its "open" position to energize line 300, the switch simultaneously disconnects the solenoid of valve 381 from the pulse line 360, and the valve 52 is thus maintained in its open position and is not oscillated. After the counting solenoid 380 has received the preselected number of pulses from line 360, the relay 368a is mechanically tripped de-energizing the solenoid of valve 376 and the solenoid of valve 381 which operates the hopper valve 52.

The operation of the yeast food timer 280 is quite similar to that of the water timer 272, except that the wiring is slightly different. In the "off and reset" position, as illustrated, the clutch 324 and synchronous timing motor 320 of the yeast food timer are in parallel between the clutch activation line 350 and common bus 292, and when the clutch activation line 350 is energized, the yeast food timer motor 320 and the yeast food timer clutch 324 are simultaneously energized. The energization of clutch 324 causes the movement of switch 330 of the yeast food timer upwardly to its "timing" position (see FIG. 15) to energize the relay control 386 which operates relays 386a, 386b and 386c in the 220 volt yeast food motor circuit (see FIG. 13). Thus, during the timing, relay control 386 is energized and relays 386a, 386b and 386c remain closed permitting the operation of the yeast food motor 144. When the synchronous motor 320 has operated for its preselected period of time, the switch 326 is tripped to break the circuit to timer motor 320 and relay control 386, thus opening the relays in the yeast food motor circuit.

The operation of the mixer timer 282 is also quite similar to that of the water timer 272, except again that the wiring is slightly different. The mixer timer motor 320 and the mixer timer clutch 324 are in parallel and both are energized from activation line 350 through a "remix" switch 392 when the timer is in its "off and reset" position as illustrated. This causes switch 332 to close completing the circuit from activation line 350 through relay control 394. When relay control 394 is energized relays 394a, 394b and 394c in the 220 volt mixer motor circuit opens to cause operation of the mixer motor 42. The mixer timer motor 320 is set to operate for a preselected period of time after which the switches 326 and 328 are mechanically tripped to their down or "timed out" position, such as illustrated in FIG. 16, breaking the circuit to the relay control 394 and de-energizing the mixer motor 42. Breaking of the circuit between contacts C and D in the mixer timer 282 also de-energizes the synchronization line 354 and the relay control 356 thus opening relay 356d and de-energizing the pulse line 360.

If for any reason it is desired to remix the contents of the pressure vessel 30, the "remix" button controlling switch 392 may be depressed interrupting the portion of the circuit between the mixer timer 282 and the activation line 350, deenergizing the clutch 324 and resetting the mixer timer. When the "remix" button is released switch 392 closes and the mixing cycle is again begun. Since the other mixers and timers are "timed out" or "counted out" and are not reset until activation line 350 is de-energized, there will be no dispensing during the remix cycle.

When the mixer timer 282 is "timed out" and the switch 328 is in its down position in engagement with contact E, light 396 is lit signaling that the mixing has been completed and that the rehydrated yeast product in the pressure vessel 30 is ready for discharge. Terminal E of the mixer timer 282 is connected to terminal A of the discharge timer 284 through a discharge control switch 400 and a discharge start switch 402 which are in parallel. The "automatic" operating line 298 is also connected to terminal A of the discharge timer through the discharge control switch 400. The discharge control switch 400 is a double pole switch and is operative alternatively in three positions. This switch is illustrated in its "automatic" position closing the circuit between terminal E of the mixer timer 282 and terminal A of the discharge timer 284. When this switch is in this position the discharge timer 284 will be automatically energized immediately upon the swinging of switch 328 into contact with terminal E at the end of the mixing cycle. When the discharge control switch 400 is swung to its opposite extreme or "discharge" position, "automatic" line 298 is connected into the discharge timer terminal A and the timer is immediately energized independently of the mixer timer 282. This "discharge" position is utilized to discharge a stopped batch of rehydrated yeast or for discharging cleaning solution from the pressure vessel 30. In the intermediate or "manual" position, the switch 400 is disengaged from its terminals and in this position there can be no energization of the discharge timer 284 through this switch. When the mixer timer 282 has been timed out and terminal E has been engaged, the discharge timer 284 may be energized only by depressing the discharge start button associated with the switch 402.

For the normal operation of the machine, the discharge control button is in either the "automatic" or the "manual" position. As previously indicated, when in the "automatic" position upon timing out of the mixer timer 282, the connection is made between activation line 350 and the terminal A of the discharge timer 284 through switch 328 of the mixer timer and through switch 400 of the discharge control. With the application of voltage to terminal A of the discharge timer either through switch 400 or switch 402 clutch 324 and motor 320 which are connected in parallel are energized. The synchronous motor 320 runs for a preselected period of time depending upon its setting. It will be noted that when the clutch 324 is initially energized, the secondary switches 330 and 332 close and an electrical circuit is made from "automatic" line 298 through terminals F and B in the timer and through the motor 320 and the clutch 324. This circuit acts as a "holding" circuit permitting the discharge start button to be released and switch 402 to be opened if "manual" discharge is being used.

When switch 332 of the discharge timer is closed, solenoid valves 406 and 408, which are connected in parallel, are energized. Valve 406 controls the application of air pressure to the hydraulic cylinder 38 which operates the discharge valve 37, and the valve 408 controls the application of air pressure to the pressure vessel 30. Lid latch detection switch 36 is in series with solenoid valve 408 preventing the energizing of valve 408 and the application of pressure to vessel 30 unless the lid is properly latched. A light 412 connected in parallel with solenoid valve 410 and located on the control panel 78 signals the pressurizing of the pressure vessel 30 when the valve is energized.

An emergency stop switch 416 is connected in the "holding" circuit of the discharge timer 284 between automatic line 298 and terminal F in the discharge timer. This switch is also connected in the holding line 337 of the "holding" circuit for the water timer 272. Depressing emergency stop switch immediately stops the cycle. All timers and counters are automatically reset and if an incompleted batch of rehydrated yeast is in the pressure vessel 30, it should be discharged by turning the discharge selector switch to its "discharge" position.

The discharge timer motor 320 is operated for a preselected period of time after which the switches 326 and 328 are tripped breaking the "holding" circuits to both the water timer 272 and the discharge timer 284. The water timer is thereby automatically reset, and clutch activation line 350 is deenergized causing all of the remaining timers and counters to be reset.

To facilitate the discharge of materials from each of the dispensers and the cleaning of the apparatus, an override switch 420 is provided, and when this switch and the cycle start switch 302 are closed by simultaneously depressing the buttons associated with each, the dispensers will discharge their contents into the hopper 54 notwithstanding the fact that the detection circuit 304 is open because of insufficient material in the dispensing mechanisms and notwithstanding the fact that the water in the pressure vessel 30 is above or below the prescribed temperature range.

The operation of the machine is summarized as follows:

The water in receptacle 64 is heated by means of heating elements 76 and 77 which are operated through thermostatic relays 76a and 77a, respectively. The valve control switch 296 is in its "automatic" position as is the discharge control valve 400. If there is insufficient material in any of the dispensers or if the cover is not latched, one of the switches in the detection system 304 will be open and the voltage drop across the neon indicating light shunting that switch will be sufficient to prevent the energization of the water timer 272. If proper quantities of materials are present in each of the dispensers and if the cover is properly latched, when the cycle start switch 302 is depressed, the water timer 272 will be energized.

After being initially energized, the clutch 324 in the water timer 272 is held in position by holding line 337 through the discharge timer 284 from automatic line 298. The water solenoid 336 is operated from line 298 through the switch 332 of the water timer, and water is permitted to flow into the pressure vessel 30 from tank 64 until the timing motor 320 is "timed out" whereupon the primary switches of the water timer are tripped de-energizing the water solenoid and also energizing activation line 350, if the water in the pressure vessel 30 is at the prescribed temperature. If, however, the water is not at the proper temperature, light 344 and bell 348 will signal this defect, and activation line 350 will not be energized.

Activation line 350 not only energizes the yeast food and mixer timers as well as all of the counters, but also this line energizes the synchronizing line 354 and the pulse line 360 through the various segments 350a, 350b and 350c of the pulse motor 350 and the various relays 356a, 356b, 356c and 356d operated by relay control 356. The pulses from line 360 operate the solenoid 202 of the enzyme tablet dispenser 86, the solenoids 226, 228, 230, 232 and 234 of the enrichment wafer dispenser 88 and the valve 376 controlling the air cylinder 108 of the yeast dispensing mechanism 81. The number of pulses applied to each of these dispensing mechanisms is dependent upon the setting of the counter associated therewith. Thus, enzyme tablet dispenser 86, enrichment wafer dispenser 88 and yeast dispenser 81 are controlled to discharge the preselected volumetric quantities of these materials into the hopper 54. The pulses from line 360 also effect the oscillation of the hopper valve 52 to facilitate the free movement of materials therethrough.

The activation line 350 causes the operation of the yeast food motor 144 and the mixer motor 42 during the preselected timing periods for each of these mechanisms. After the mixing has been completed, the mixer timer 282 energizes the discharge timer which operates solenoid valves 406 and 408 to apply air pressure to pressure vessel 30 and to open the discharge valve 37 at the base of the pressure vessel. This pressure is maintained for a predetermined length of time depending upon the setting of the discharge timer 284 after which time the discharge timer is "timed out" and the holding circuits in both the discharge timer 284 and the water timer 272 are opened de-energizing the activation line 350 and resetting all of the counters and timers in preparation for the next succeeding cycle.

In order to produce the next batch of rehydrated yeast, all that need be done is to depress the button associated with the cycle start switch 302. Except for the settings of the respective timers and counters there is no opportunity for human error and each rehydrated yeast batch will be identical in quality and activity to the preceding and succeeding batches. The optimum conditions for the restoration and rehydration of the dry yeast are automatically established, and the only maintenance required is that of keeping the dispensers charged and that of periodically cleaning the apparatus.

Although the invention has been described with a certain degree of particularity, it is understood that the present disclosure has been made only by way of example and that many modifications and changes in various details may be resorted to without departing from the spirit and scope of the invention, as hereinafter claimed.

What is claimed is:

1. An apparatus for effecting the rehydration of active dry yeast which comprises, a pressurizable mixing chamber, a hopper, a first valve associated with said hopper and in communication with said chamber adjacent the top thereof, said first valve being adapted to open to permit the transmission of materials therethrough from said hopper into said chamber and when closed being effective to sealingly close said chamber, whereby a pressure may be developed therein, means for delivering a predetermined quantity of water into said chamber at a predetermined temperature, a plurality of mechanisms for dispensing predetermined quantities of materials including active dry yeast and substances promotive of the rehydration and growth of the yeast into said hopper, control means for said first valve to effect opening thereof as said materials are being dispensed by said mechanisms into said hopper, mixing means for effecting mixing within said chamber as said materials are being transmitted thereto through said first valve, a second valve adjacent the bottom of said chamber, and means for pressurizing said chamber after the mixing has been completed whereby the rehydrated yeast product may be discharged from said chamber through said second valve.

2. The structure of claim 1 in which said second valve is hydraulically operated by said chamber pressurizing means, whereby said valve is opened for the discharge of the rehydrated yeast product therethrough simultaneously with the pressurizing of said chamber.

3. An apparatus for effecting the rehydration of active dry yeast which comprises, a mixing chamber, a hopper, a valve associated with said hopper and in communication with said chamber, said valve when closed being effective to sealingly close said chamber and being adapted to open to permit the transmission of materials therethrough from said hopper into said chamber, means for delivering a predetermined quantity of water into said chamber at a predetermined temperature, a plurality of mechanisms for dispensing predetermined quantities of materials including active dry yeast and substances promotive of the rehydration and growth of the yeast into said hopper, valve control means for effecting oscillation of said valve between its open and closed positions as said materials are being dispensed by said mechanisms into said hopper, whereby said materials may be transmitted freely through said valve into said chamber, mixing means for effecting mixing within said chamber as said materials are delivered thereto, and means for discharging the rehydrated yeast product from said chamber after the mixing has been completed.

4. An apparatus for effecting the rehydration of active dry yeast which comprises, a mixing chamber, a hopper, a valve associated with said hopper and in communication with said chamber, said valve when closed being effective to sealingly close said chamber and being adapted to open to permit the transmission of materials therethrough from said hopper into said chamber, means for delivering a predetermined quantity of water into said chamber at a predetermined temperature, a plurality of mechanisms for dispensing predetermined quantities of materials including active dry yeast and substances promotive of the rehydration and growth of the yeast into said hopper, valve control means responsive to a signal applied thereto for operating said valve, means for repetitively applying a signal to said valve control means as materials are being dispensed by said mechanisms into said hopper, whereby said valve is repetitively oscillated between its open and closed positions and the materials may be freely transmitted therethrough into said chamber, mixing means for effecting mixing within said chamber as said materials are delivered thereto, and means for effecting the discharge of the rehydrated yeast product from said chamber after the mixing has been completed.

5. An apparatus for effecting the rehydration of active dry yeast which comprises, a mixing chamber, means for delivering water into said chamber at a predetermined temperature, a plurality of mechanisms for dispensing materials including active dry yeast and materials promotive of the rehydration and growth of the yeast into said chamber, sensing means on said mechanisms for determining whether sufficient quantities of materials are present in said mechanisms to permit the production of the desired rehydrated yeast product in said chamber, adjustable control means for at least one of said mechanisms responsive to a preselected number of signals applied thereto for effecting discharge of a predetermined volumetric quantity of material from said mechanism upon receipt of each such signal, actuation means responsive to said sensing means for repetitively applying a signal to said control means only when sufficient quantities of yeast and promotive materials are present in said mechanisms, mixing means for effecting mixing within said chamber as said materials are being delivered thereto, and means for effecting discharge of the rehydrated yeast product from said chamber after the mixing has been completed.

6. An apparatus for effecting the rehydration of active dry yeast which comprises, a mixing chamber, means for delivering water into said chamber at a predetermined temperature, a plurality of mechanisms for dispensing materials including active dry yeast and materials promotive of the rehydration and growth of the yeast into said chamber, actuation means for repetitively applying a signal to at least one of said dispensing mechanisms, said one mechanism having adjustable control means responsive to a preselected number of signals from said actuation means for effecting discharge of a predetermined volumetric quantity of material from said mechanism into said chamber upon receipt of each such signal, mixing means for effecting mixing within said chamber as said materials are being delivered thereto, and means for effecting discharge of the rehydrated yeast product from said chamber after the mixing has been completed.

7. An apparatus for effecting the rehydration of active dry yeast which comprises a mixing chamber, adjustable means for dispensing a preselected quantity of water into said chamber at a predetermined temperature, a plurality of dispensing mechanisms for dispensing materials including active dry yeast and substances for promoting the growth and rehydration thereof into said chamber, means responsive to said water dispensing means for repetitively applying a signal to at least one of said material dispensing mechanisms, said one mechanism having adjustable control means responsive to a preselected number of signals from said signal applying means and effective to cause said one mechanism to dispense a predetermined quantity of material therefrom into said chamber upon receipt of each of the preselected number of said signals, mixing means for effecting mixing within said chamber as said materials are being delivered thereto, and means for effecting discharge of the rehydrated yeast product from said chamber after the mixing has been completed.

8. An apparatus for effecting the rehydration of active dry yeast which comprises, a mixing chamber, means for delivering water into said chamber at a predetermined temperature, a plurality of mechanisms for dispensing materials including active dry yeast and materials promotive of the rehydration and growth of the yeast into said chamber, sensing means on said mechanisms for determining whether sufficient quantities of materials are present in said mechanisms to permit the production of the desired rehydrated yeast product, actuation means responsive to said sensing means and said water delivery means for repetitively applying a signal to at least one of said dispensing mechanisms only when sufficient quantities of mateirals are present in said mechanisms and only when the water has been delivered to said chamber at a predetermined temperature; said one mechanism having adjustable control means responsive to a preselected number of signals from said actuation means for effecting discharge of a predetermined volumetric quantity of material from said mechanism into said chamber upon receipt of each such signal, mixing means for effecting mixing within said chamber as said materials are being delivered thereto, and means for effecting discharge of the rehydrated yeast product from said chamber after the mixing has been completed.

9. An apparatus for effecting the rehydration of active dry yeast which comprises, a mixing chamber, a hopper, a valve associated with said hopper and in communication with said chamber, said valve when closed being effective to sealingly close said chamber and being adapted to open to permit transmission of materials therethrough from said hopper into said chamber, means for delivering a predetermined quantity of water into said chamber at a predetermined temperature, a plurality of mechanisms for dispensing predetermined quantities of materials including active dry yeast and substances promotive of the rehydration and growth of the yeast into said hopper, sensing means for determining whether the water delivered to said chamber is at the predetermined temperature and for determining whether sufficient quantities of materials are present in said dispensing mechanisms to permit the production of the desired rehydrated yeast product, actuation means responsive to said sensing means for repetitively appling a signal to said valve and at least one of said dispensing mechanisms only when sufficient quantities of materials are present in said mechanisms and only when the water has been delivered to said chamber at the predetermined temperature, said valve having control means responsive to each signal from said actuation means for effecting oscillative opening and closing movements of said valve, whereby the materials may be freely transmitted therethrough into said chamber, said one dispensing mechanism having adjustable control means responsive to a preselected number of signals from said actuation means for effecting discharge of a predetermined volumetric quantity of material from said mechanism into said hopper upon receipt of each such signal, mixing means for effecting mixing within said chamber as said materials are being delivered thereto, and means for effecting discharge of the rehydrated yeast product from said chamber after the mixing has been completed.

10. An apparatus for effecting the rehydration of active dry yeast which comprises, a mixing chamber, means for delivering water into said chamber at a predetermined temperature, a plurality of mechanisms for dispensing materials including active dry yeast and materials promotive of the rehydration and growth of the yeast into said chamber, at least one of said dispensing mechanisms being power actuated to dispense material therefrom at a predetermined volumetric rate, adjustable timing means for energizing said one mechanism for a preselected period of time whereby a preselected quantity of material may be dispensed from said mechanism into said chamber, mixing means for effecting mixing within said chamber as said materials are being delivered thereto, and means for effecting discharge of the rehydrated yeast product from said chamber after the mixing has been completed.

11. An apparatus for effecting the rehydration of active dry yeast which comprises, a mixing chamber, means for delivering water into said chamber at a predetermined temperature, a plurality of mechanisms for dispensing materials including active dry yeast and materials promotive of the rehydration and growth of the yeast into said chamber, sensing means for determining whether the water delivered to said chamber is at the predetermined temperature and for determining whether sufficient quantities of materials are present in said dispensing mechanisms to permit the production of the desired rehydrated yeast product, at least one of said dispensing mechanisms being power actuated to dispense material therefrom at a predetermined volumetric rate; adjustable timing means responsive to said sensing means for energizing said one dispensing means for a preselected period of time only when sufficient quantities of materials are present in said mechanisms and only when the water has been delivered to said chamber at the predetermined temperature, whereby a preselected quantity of material may be dispensed from said one mechanism into said chamber, mixing means for effecting mixing within said chamber as said materials are being delivered thereto, and means for effecting discharge of the rehydrated yeast product from said chamber after the mixing has been completed.

12. An apparatus for effecting the rehydration of active dry yeast which comprises, a mixing chamber, means for delivering water into said chamber at a predetermined temperature, a plurality of mechanisms for dispensing materials including active dry yeast and materials promotive of the rehydration and growth of the yeast into said chamber, actuation means for repetitively applying a signal to at least one of said dispensing mechanisms, said one mechanism having adjustable control means responsive to a preselected number of signals from said actuation means for effecting discharge of a predetermined volumetric quantity of material from said mechanism into said chamber upon receipt of each such signal, at least one other of said dispensing mechanisms being power actuated to dispense material therefrom at a predetermined volumetric rate, adjustable timing means for energizing said other mechanism for a preselected period of time whereby a preselected quantity of material may be dispensed from said mechanism into said chamber, mixing means for effecting mixing within said chamber as said materials are being delivered thereto, and means for effecting discharge of the rehydrated yeast product from said chamber after the mixing has been completed.

13. An apparatus for effecting the rehydration of active dry yeast which comprises, a mixing chamber, means for delivering water into said chamber at a predetermined temperature, a plurality of mechanisms for dispensing materials including active dry yeast and materials promotive of the rehydration and growth of the yeast into said chamber, sensing means for determining whether the water delivered to said chamber is at the predetermined temperature and for determining whether sufficient quantities of materials are present in said dispensing mechanisms to permit the production of the desired rehydrated yeast product, adjustable control means for at least one of said mechanisms responsive to a preselected number of signals applied thereto for effecting discharge of a predetermined volumetric quantity of material from said mechanism upon receipt of each such signal, at least one other of said dispensing mechanisms being power actuated to dispense material therefrom at a predetermined volumetric rate, adjustable timing means for energizing said other mechanism for a preselected period of time whereby a preselected quantity of material may be dispensed from said mechanism into said chamber, actuation means responsive to said sensing means for actuating said timing means and for repetitively applying a signal to said control means only when sufficient quantities of materials are present in said mechanisms and only when the water has been delivered to said chamber at a predetermined temperature, mixing means for effecting mixing within said chamber as said materials are being delivered thereto, and means for effecting discharge of the rehydrated yeast product from said chamber after the mixing has been completed.

14. An apparatus for effecting the rehydration of active dry yeast which comprises, a mixing chamber, a hopper, a valve associated with said hopper and in communication with said chamber, said valve when closed being effective to sealingly close said chamber and being adapted to open to permit the transmission of materials therethrough from said hopper into said chamber, means for delivering a predetermined quantity of water into said chamber at a predetermined temperature, a plurality of mechanisms for dispensing predetermined quantities of materials including active dry yeast and substances promotive of the rehydration and growth of the yeast into said hopper, sensing means for determining whether the water delivered to said chamber is at the predetermined temperature and for determining whether sufficient quantities of materials are present in said dispensing mechanisms to permit the production of the desired rehydrated yeast product, valve control means responsive to a signal applied thereto for operating said valve, adjustable control means for at least one of said mechanisms responsive to a preselected number of signals applied thereto for effecting discharge of a predetermined volumetric quantity of material from said mechanism upon receipt of each such signal, at least one other of said dispensing mechanisms being power actuated to dispense material therefrom at a predetermined volumetric rate, adjustable timing means for energizing said other mechanism for a preselected period of time whereby a preselected quantity of material may be dispensed from said mechanism into said hopper, actuation means responsive to said sensing means for actuating said timing means and for repetitively applying a signal to said mechanism control means and said valve control means only when sufficient quantities of materials are present in said mechanisms and only when the water has been delivered to said chamber at the predetermined temperature, mixing means for effecting mixing within said chamber as said materials are being delivered thereto, and means for effecting discharge of the rehydrated yeast product from said chamber after the mixing has been completed.

15. The combination recited in claim 14 in which the material adapted to be dispensed by said one mechanism is tableted, and the control means for said one mechanism is responsive to each of the preselected number of signals from said actuation means to effect the dispensing of an integral number of tablets into said hopper.

16. The combination recited in claim 14 wherein said one mechanism includes a receptacle, a transfer chamber in communication with said receptacle, and an adjustable volumetric material transporting plunger reciprocally movable within said transfer chamber between a first position in which it is adapted to receive material from said receptacle and a second position in which it is adapted to release said material into said hopper, said control means being responsive to each of the preselected number of signals from said actuation means to effect reciprocal movement of said plunger within said transfer chamber.

17. An apparatus for effecting the rehydration of active dry yeast which comprises, a pressurizable mixing chamber including a cover and latching means for locking said cover in closed position with respect to said chamber, detection means for determining when said cover member is locked in position, a hopper, a valve associated with said hopper and in communication with said chamber and selectively movable between two positions, said valve when in one of said positions being effective to permit the transmission of materials therethrough from said hopper into said chamber and when in the other of said positions being effective to sealingly close said chamber, adjustable means for delivering a preselected quantity of water to said chamber at a predetermined temperature, a plurality of mechanisms for dispensing material including active dry yeast, and substances promotive of the rehydration and growth of the yeast into said hopper, sensing means on said mechanisms for determining whether sufficient quantities of materials are present in said mechanisms to permit the production of the desired rehydrated yeast product, said mechanisms being responsive to said sensing means and to said detection means to dispense said materials only when a sufficient quantity of each material is present in the dispensing mechanism therefor, and said cover member is locked in its closed position, valve control means for opening said valve as materials are being dispensed from said mechanisms into said hopper, mixing means responsive to said sensing means and said detection means to effect mixing within said chamber as said materials are being delivered thereto, and discharge means responsive to said mixing means for effecting discharge of said chamber after the mixing has been completed.

18. The structure of claim 17 in which said discharge means includes a discharge valve adjacent the bottom of said chamber and means for applying a hydraulic pressure within said chamber whereby the rehydrated yeast product is forced out of said chamber through said discharge valve.

19. The structure of claim 17 wherein valve control means is effective to oscillate said valve whereby the materials dispensed into said hopper may move freely therethrough into said chamber.

20. An apparatus for effecting the rehydration of active dry yeast which comprises, a mixing chamber, a hopper, a valve associated with said hopper and in communication with said chamber, said valve when closed being effective to sealingly close said chamber and being adapted to open to permit the transmission of materials therethrough from said hopper into said chamber, a plurality of mechanisms for dispensing predetermined quantities of materials including active dry yeast and substances promotive of the rehydration and growth of the yeast into said hopper, material sensing means on said mechanisms for determining whether sufficient quantities of materials are present in said mechanisms to permit the production of the desired rehydrated yeast product in said chamber, means responsive to said material sensing means for delivering a predetermined quantity of water to said chamber at a predetermined temperature, temperature sensing means for determining whether the water delivered to said chamber is at the predetermined temperature, valve control means responsive to a signal applied thereto for operating said valve, adjustable control means for at least one of said dispensing mechanisms responsive to a preselected number of signals applied thereto for effecting discharge of a predetermined volumetric quantity of material from said mechanism upon receipt of each such signal, at least one other of said dispensing mechanisms being power actuated to dispense material therefrom at a predetermined volumetric rate, adjustable timing means for energizing said other mechanism for a preselected period of time whereby a preselected quantity of material may be dispensed from said mechanism into said hopper, actuation means responsive to said temperature sensing means for actuating said timing means and for repetitively applying a signal to said mechanism control means and said valve control means only when the water in said chamber is at the predetermined temperature, mixing means for effecting mixing within said chamber as the materials are being delivered thereto, and means responsive to said mixing means for automatically effecting discharge of the rehydrated yeast product from said chamber after the mixing has been completed.

References Cited in the file of this patent

UNITED STATES PATENTS

| | | |
|---|---|---|
| 2,863,191 | Dietert et al. | Dec. 9, 1958 |
| 2,873,955 | Sauer | Feb. 17, 1959 |